United States Patent
Liu et al.

(10) Patent No.: US 10,187,124 B2
(45) Date of Patent: Jan. 22, 2019

(54) BEAM-CHANGE INDICATION FOR CHANNEL ESTIMATION ENHANCEMENT

(71) Applicant: MEDIATEK INC., Hsinchu (TW)

(72) Inventors: Jianhan Liu, San Jose, CA (US); Shuling Feng, Saratoga, CA (US); Thomas Edward Pare, Jr., Mountain View, CA (US); YungPing Hsu, Taipei (TW)

(73) Assignee: MEDIATEK INC, Hsin-Chu (TW)

( * ) Notice: Subject to any disclaimer, the term of this patent is extended or adjusted under 35 U.S.C. 154(b) by 0 days.

(21) Appl. No.: 15/283,168

(22) Filed: Sep. 30, 2016

(65) Prior Publication Data

US 2017/0099089 A1    Apr. 6, 2017

Related U.S. Application Data

(60) Provisional application No. 62/235,959, filed on Oct. 1, 2015.

(51) Int. Cl.
*H04B 7/02* (2018.01)
*H04L 27/26* (2006.01)
(Continued)

(52) U.S. Cl.
CPC .......... *H04B 7/028* (2013.01); *H04B 7/0617* (2013.01); *H04L 25/022* (2013.01);
(Continued)

(58) Field of Classification Search
CPC .... H04W 84/12; H04W 88/08; H04B 7/0695; H04B 7/0413; H04B 7/0452; H04B 7/0617
See application file for complete search history.

(56) References Cited

U.S. PATENT DOCUMENTS 7,126,533 B2    10/2006  Fiore et al.
8,213,527 B2    7/2012   Wang et al.
(Continued)

FOREIGN PATENT DOCUMENTS

CN    102149192    8/2011
EP    3098999      11/2016
(Continued)

OTHER PUBLICATIONS

EPO, Search Report for the EP patent application 16192182.0 dated Feb. 1, 2017 (10 pages).
(Continued)

*Primary Examiner* — Ross Varndell (57) ABSTRACT

A method of transmitting and receiving a HE PPDU and perform channel estimation enhancement is proposed. The HE PPDU comprises legacy preamble, HE-STF, HE-LTF, and data. A beam-change indication indicates if the pre-multiplied beamforming Q-matrix is changed from legacy preamble to H-SFT, HE-LTF, and data portion. A value of 1 indicates that Q matrix is changed. A value of 0 indicates that Q matrix is unchanged and receiver should be safe to combine L-LTF and HE-LTF. The beam-change indication can be used to significantly enhance channel estimation at receiver. When there is no beam-change, receiver does not change operation during HE-STF and HE-LTF such that the channel estimations can rely on the combination of L-LTFs, L-SIG, RL-SIG, HE-SIGAs and HE-LTF.

18 Claims, 9 Drawing Sheets

(51) Int. Cl.
  *H04L 25/02* (2006.01)
  *H04B 7/06* (2006.01)
  *H04W 84/12* (2009.01)
(52) U.S. Cl.
  CPC ...... *H04L 25/0202* (2013.01); *H04L 25/0204* (2013.01); *H04L 25/0228* (2013.01); *H04L 25/0242* (2013.01); *H04L 27/2601* (2013.01); *H04W 84/12* (2013.01)

(56) References Cited

U.S. PATENT DOCUMENTS

| | | |
|---|---|---|
| 8,619,641 B2 | 12/2013 | Guo |
| 8,929,192 B2 | 1/2015 | Kainulainen et al. |
| 9,615,214 B2 | 4/2017 | Syrjarinne et al. |
| 9,647,868 B2 | 5/2017 | Jiao et al. |
| 2001/0006540 A1 | 7/2001 | Kim et al. |
| 2006/0158374 A1 | 7/2006 | Rahamin et al. |
| 2008/0191941 A1 | 8/2008 | Saban et al. |
| 2008/0232485 A1 | 9/2008 | Niu et al. ............ 375/260 |
| 2009/0122890 A1 | 5/2009 | Wu |
| 2010/0246720 A1 | 9/2010 | Wang et al. |
| 2011/0033004 A1 | 2/2011 | Wang et al. |
| 2011/0193739 A1 | 8/2011 | Strauch et al. |
| 2011/0243197 A1 | 10/2011 | Atarashi et al. |
| 2011/0261858 A1 | 10/2011 | Baldemair et al. |
| 2011/0274003 A1 | 11/2011 | Pare, Jr. et al. |
| 2012/0258669 A1 | 10/2012 | Honkanen et al. |
| 2012/0263211 A1 | 10/2012 | Porat et al. |
| 2013/0070701 A1 | 3/2013 | Merlin et al. |
| 2013/0089121 A1 | 4/2013 | Koo et al. |
| 2013/0265907 A1 | 10/2013 | Kim et al. |
| 2013/0321209 A1 | 12/2013 | Kalliola et al. |
| 2013/0343211 A1* | 12/2013 | Liu .............. H04L 25/0204 370/252 |
| 2014/0070996 A1 | 3/2014 | Kneckt et al. |
| 2014/0219449 A1 | 8/2014 | Shattil et al. |
| 2014/0254648 A1 | 9/2014 | Van Nee |
| 2014/0328335 A1 | 11/2014 | Zhang et al. ............ 370/338 |
| 2015/0009894 A1 | 1/2015 | Vermani et al. |
| 2015/0023449 A1 | 1/2015 | Porat et al. |
| 2015/0124739 A1 | 5/2015 | Baik et al. |
| 2015/0139091 A1 | 5/2015 | Azizi et al. ............ 370/329 |
| 2015/0139115 A1 | 5/2015 | Seok |
| 2015/0230231 A1 | 8/2015 | Fornoles, Jr. |
| 2015/0296516 A1 | 10/2015 | Jung |
| 2016/0021568 A1* | 1/2016 | Yu .............. H04L 5/0048 370/329 |
| 2016/0033614 A1 | 2/2016 | Wang et al. |
| 2016/0047885 A1 | 2/2016 | Wang et al. |
| 2016/0065467 A1 | 3/2016 | Wu et al. |
| 2016/0248542 A1 | 8/2016 | Liu et al. |
| 2016/0249165 A1 | 8/2016 | Aldana |
| 2016/0323060 A1 | 11/2016 | Hassanin et al. |
| 2016/0330055 A1 | 11/2016 | Tong |
| 2016/0352552 A1 | 12/2016 | Liu et al. |
| 2016/0366548 A1 | 12/2016 | Wang et al. |
| 2016/0370450 A1 | 12/2016 | Thorn et al. |
| 2017/0064718 A1 | 3/2017 | Bharadwaj et al. |
| 2017/0070893 A1 | 3/2017 | Wang et al. |
| 2017/0070998 A1 | 3/2017 | Wu et al. |
| 2017/0093546 A1 | 3/2017 | Wu et al. |
| 2017/0104553 A1 | 4/2017 | Liu et al. |
| 2017/0134207 A1 | 5/2017 | Liu et al. |
| 2017/0171363 A1 | 6/2017 | Sun et al. |
| 2017/0171796 A1 | 6/2017 | Wu et al. |
| 2017/0180177 A1 | 6/2017 | Wu et al. |
| 2017/0214507 A1 | 7/2017 | Kang et al. |
| 2017/0215087 A1 | 7/2017 | Amizur et al. |
| 2017/0230220 A1 | 8/2017 | Anwyl et al. |
| 2017/0230981 A1 | 8/2017 | Ryu et al. |
| 2018/0013527 A1 | 1/2018 | Sun et al. |

FOREIGN PATENT DOCUMENTS

| | | |
|---|---|---|
| WO | 2004049498 | 6/2004 |
| WO | 2010022785 | 3/2010 |
| WO | WO2015077042 A1 | 11/2013 |
| WO | 2015069811 | 5/2015 |
| WO | 2015077042 | 5/2015 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Darryn Lowe et al, "Analysis and Evaluation of MB-OFDM Dual Carrier Modulation", Telecommunicatins Information Technology Research Institute, University of Wollongong.
EPO, Search Report for the EP Patent Application 15833049.8 dated Feb. 16, 2018 (9 Pages).
International Search Report and Written Opinion of International Search Authority for PCT/CN2015/087365 dated Nov. 24, 2015 (10 Pages).
EPO, Search Report for the EP Patent Application 16191047.6 dated Feb. 14, 2017 (7 Pages).
EPO, Search Report for the EP Patent Application 16187569.5 dated Jan. 23, 2017 (12 Pages).
EPO, Search Report for the EP Patent Application 16193438.5 dated Mar. 17, 2017 (9 Pages).
EPO, Search Report for the EP Patent Application 16197315.1 dated Mar. 31, 2017 (8 Pages).
Young Hoon Kwon, Newracom, SIG Field Design Principle for 11AZ, Doc.: IEEE 802.11-15/0344R2, Mar. 2015 Slides 5-14.
Robert Stacey, Intel, Specification Framework for TGAX, IEEE P802.11 Wireless LANS, Jul. 2015 p. 3, Line 25-39, p. 4, Line 1-5, Sections 3.2.2, 3.2.3, 3.3.2, 4.1.
Katsuo Yunoki, KDDI R&D Laboratories, Considerations on HE-SIG-A/B, Doc.: IEEE 302.11-15/827R2, Jul. 2015 Slides 2-11.
Joonsuk Kim, et al., HE-SIG-B Structure, Doc: IEEE 802.11-15/0821R2, Sep. 2015 Slides 11-15.
Joonsuk Kim, Apple, HE-SIG-B Structure, Doc.: IEEE 802.11-15/0821R2, Jul. 2015 Slides 8-15.
Kaushik Josiam et al., HE-SIG-B Contents, Doc: IEEE802.11-15/1066R0, Sep. 2015, Slide 8 Slides 10, 11 Slide 17.
M. Rahaim et al., WIFE PHY Standards Review—From Early 802.11 to 'AC' and 'AD', MCL Technical Report No. Apr. 29, 2014.
Robert Stacey, Intel, Specification Framework for TGAX, IEEE P802.11 Wireless LANS, Doc.: IEEE 802.11-15/0132R8, Sep. 2015. Paragraph [3.2.4].
Tim Schmidt, "Clause 6 OFDM PHY Draft", Jan. 2010 IEEE P802.15-10-0013-00-004G, IEEE P802.15 Wireless Personal Area Networks, Progect IEEE P802.15 Working Group for Wireless Personal Area Networks (WPANS).
EPO, Search Report for the EP Patent Application 16187569.5 dated Nov. 9, 2017(6 Pages).

\* cited by examiner

BEAM-CHANGE INDICATION FOR CHANNEL ESTIMATION ENHANCEMENT

CROSS REFERENCE TO RELATED APPLICATIONS

This application claims priority under 35 U.S.C. § 119 from U.S. Provisional Application No. 62/235,959, entitled "Channel Estimation Enhancement Schemes in WLAN," filed on Oct. 1, 2015, the subject matter of which is incorporated herein by reference.

TECHNICAL FIELD

The disclosed embodiments relate generally to wireless network communications, and, more particularly, to beam-change indication for channel estimation enhancement in wireless communications systems.

BACKGROUND

In wireless communications, CSI (channel state information) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems.

CSI needs to be estimated at the receiver and usually quantized and feedback to the transmitter. Since the channel condition vary, instantaneous CSI needs to be estimated on a short-term basis. A popular approach is so-called training sequence (or pilot sequence), where a known signal is transmitted and a channel response matrix H is estimated using the combined knowledge of the transmitted and the received signal.

The accuracy of channel estimation is essential to receiver performance. For high modulations such as 256QAM and 1024QAM, enhancing channel estimation accuracy can significantly improve PER performance. For 1024QAM, enhancing channel estimation accuracy also helps reduce the TX and RX EVM requirement. Channel estimation inaccuracy is one key factor that degrades the performance of wireless networks. In wireless networks, various methods of enhancing channel estimation accuracy have been widely used. For example, channel smoothing when the channels of adjacent sub-carriers are similar, data-aided feedback channel tracking when complexity and latency are not critical, and pilots-based channel tracking when pilots are enough.

IEEE 802.11 is a set of standards for implementing wireless local area network (WLAN) communication in the 2.4, 3.6, 5, and 60 GHz frequency bands. Within the IEEE 802.11 standards, IEEE 802.11ac covers very high throughput with potential improvements over IEEE 802.11n, IEEE 802.11ah covers Sub 1 GHz sensor network and smart metering, and upcoming IEEE 802.11ax considers the improvement of spectrum efficiency to enhance the system throughput in high-density scenarios of wireless devices and will become a successor to IEEE 802.11ac. Beam-change indication can be used to significantly enhance channel estimation at receiver. In the present invention, a useful method of beam-change indication is proposed to enhance channel estimation performance based on the IEEE 802.11ax and the upcoming IEEE 802.1ah standards.

SUMMARY

A method of transmitting and receiving a HE PPDU and perform channel estimation enhancement is proposed. The HE PPDU comprises legacy preamble, HE-STF, HE-LTF, and data. A beam-change indication indicates if the pre-multiplied beamforming Q-matrix is changed from legacy preamble to H-SFT, HE-LTF, and data portion. A value of 1 indicates that Q matrix is changed. A value of 0 indicates that Q matrix is unchanged and receiver should be safe to combine L-LTF and HE-LTF. The beam-change indication can be used to significantly enhance channel estimation at receiver. When there is no beam-change, receiver does not change operation during HE-STF and HE-LTF such that the channel estimations can rely on the combination of L-LTFs, L-SIG, RL-SIG, HE-SIGAs and HE-LTF.

In one embodiment, a wireless device receives a high efficiency (HE) frame in a wireless communication network. The HE frame comprises a legacy preamble containing a first training field and a HE preamble containing a signal field and a second training field. The wireless device performs channel estimation based on the first training field and the second training field for a first channel condition and a second channel condition, respectively. The wireless device decodes a beam-change indicator in the signal field and determining whether there is beam change between the first channel condition and the second channel condition. The wireless device performs a channel estimation enhancement by deriving an enhanced channel response matrix based on both the first training field and the second training field if the beam-change indicator indicates no beam change.

In another embodiment, a wireless device generates a first training field for a legacy preamble by applying a first set of beam-steering matrices to a training sequence. The wireless device generates a second training field for a high efficiency (HE) preamble by applying a second set of beam-steering matrices to the training sequence. The wireless device inserts a beam-change indicator in a signal field. The beam-change indicator indicates whether there is beam change between the first training field and the second training field. The wireless device encodes the first training field, the signal field, and the second training field into a high efficiency (HE) frame to be transmitted over two spatial streams in a wireless communication network.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
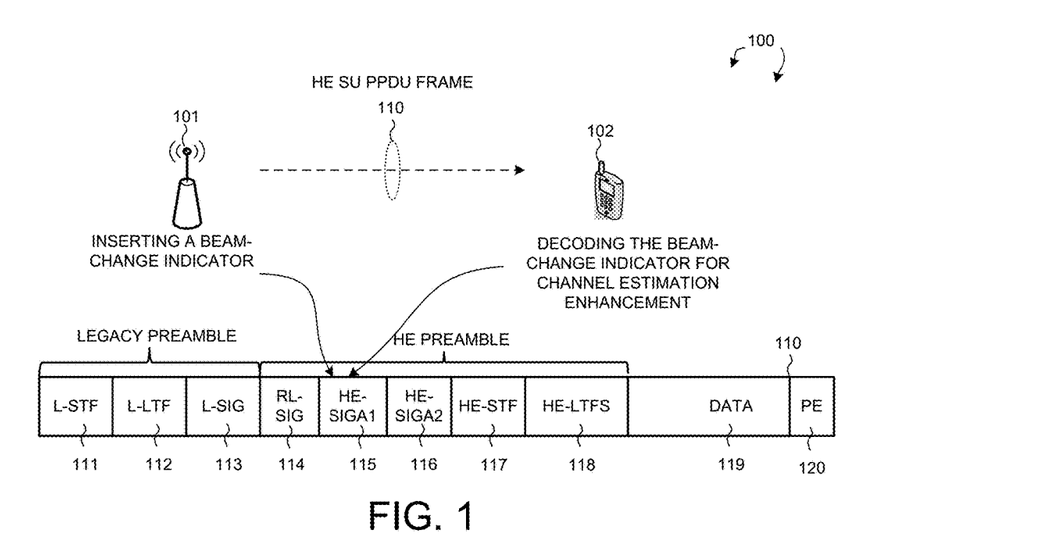
FIG. 1 illustrates a wireless communications system with enhanced channel estimation in accordance with a novel aspect.

FIG. 1 illustrates a wireless communications system 100 with enhanced channel estimation in accordance with one novel aspect. Wireless local area network WLAN 100 comprises a wireless access point AP 101 and a wireless station STA 102. In wireless communications systems, wireless devices communicate with each other through various well-defined frame structures. In general, a frame comprises a Physical Layer Convergence Procedure (PLCP) Protocol Data Unit (PPDU), a frame header, and a payload. Frames are in turn divided into very specific and standardized sections. For example, in the upcoming IEEE 802.11ah standard, a transmitter is required to be able to transmit a long preamble frame structure over 2 MHz, 4 MHz, 6 MHz, 8 MHz, and 16 MHz channels.

FIG. 1 also depicts a high efficiency single user (HE SU) PPDU frame 110, which comprises a legacy short training field (L-STF 111), a legacy long training field (L-LTF 112), a legacy signal field (L-SIG 113), a repeat legacy signal field (RL-SIG 114), a HE signal A1 field (HE-SIGA1 115), a HE signal A2 field (HE-SIGA2 116), a HE short training field (HE-STF 117), HE long training fields for data (HE-LTFs 118), HE-data payload 119, and a Packet Extension (PE) 120. L-STF 111, L-LTF 112, and L-SIG form the legacy preamble. RL-SIG 114, HE-SIGA1 115, HE-SIGA2 116, HE-STF 117, and HE-LTFs 118 form the HE preamble. For single user (SU) transmission, the number of HI-LTFs is equal to the number of spatial streams (Nsts) or Nsts plus one (Nsts+1). For example, for one spatial streams, there is one HE-LTF, for two spatial streams, there are two HE-LTFs.

In the example of FIG. 1, HE SU PPDU 110 is transmitted from AP 101 to STA 102. LTF 112 is used for channel estimation and the decoding of L-SIG at the receiver side, while HE-LTF 115 is used for channel estimation and the decoding of HE-SIG and data at the receiver side. When HE SU PPDU frame 110 is transmitted, beam steering matrices can be applied to the HE long preamble frame for beamforming to achieve spatial expansion or other purposes. With such HE long preamble frame structure, two different sets of beam steering matrices are typically applied. For example, a first set of beam steering matrices W(k) is applied to each subcarrier k of fields L-STF, L-LTF, and L-SIG (e.g., those fields are also referred to as the legacy preamble and the Omni portion of the long preamble frame). On the other hand, a second set of beam steering matrices Q(k) is applied to each subcarrier k of fields HE-STF, HE-LTFs, RL-SIG, HE-SIG-A1, HE-SIG-A2, and data (e.g., also referred to as the HE preamble and the Data portion of the long preamble frame). The dimension of W(k) and Q(k) is related to the number of antenna and the number of data streams to be transmitted in a corresponding MIMO scheme.

Based on each transmitter, the beam steering matrices W(k) and Q(k) may either be the same or different. This is because W(k) may be a column vector with N-th TX antenna elements with element $i_{TX}$ being $\exp(-j2\pi k\Delta_F T_{CS}^{iTX})$, where $T_{CS}^{iTX}$ represents the cyclic shift for transmitter chain $i_{TX}$ (e.g., for Omni-directional transmission), while Q(k) may be precoding matrices (e.g., for MIMO beamforming transmission) based on previous channel sounding feedback. However, the beam steering matrices W(k) and Q(k) may be exactly the same under certain scenarios. For example, when there is no channel feedback information, both W(k) and Q(k) are identity matrices I(k). Therefore, for the same communication link between a transmitter and a receiver, the wireless channel condition for transmitting L-STF, LLTF, L-SIG and the channel condition for transmitting HE-STF, HE-LTFs, RL-SIG, HE-SIG-A1, HE-SIG-A2, and data, may either be the same or different, depending on W(k) and Q(k).

At the receiver side, channel estimation is performed based on received L-LTF and HE-LTFs symbols. If the beam steering matrices W(k) and Q(k) are the same, then the channel condition used to transmit L-STF, L-LTF, L-SIG is the same as the channel condition used to transmit HE-STF, HE-LTFs, HE-SIG, and data. Traditionally, channel estimation for data is performed only based on HE-LTF symbols. In one novel aspect, the channel estimation for data can be enhanced by utilizing channel estimation based on both L-LTF and HE-LTF symbols if the channel condition (e.g., the beam steering matrices) has not been changed by the transmitter. In one embodiment, as illustrated in FIG. 1, a beam-change indicator is inserted into field HE-SIGA1 by AP 101 at the transmitter side, and at the receiver side, STA 102 decodes the beam-change indicator from the signal field to achieve channel estimation enhancement. For high modulations such as 256QAM and 1024QAM, enhancing channel estimation accuracy can significantly improve PER performance. For 1024QAM, enhancing channel estimation accuracy also helps reduce the TX and RX EVM requirement.

Figure 2:
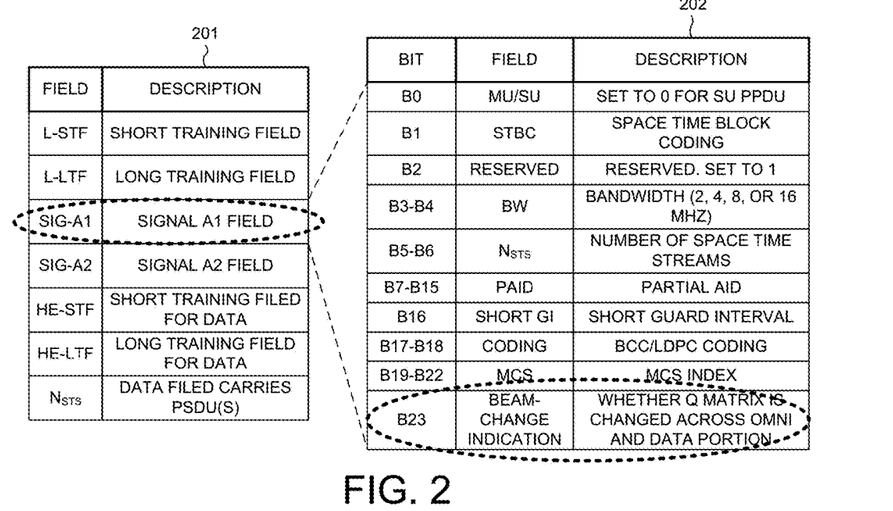
FIG. 2 is a diagram of a long preamble frame and a signal field of the long preamble frame.

FIG. 2 is a diagram of a HE long preamble frame structure and signal fields of the long preamble frame. Table 201 lists all the fields including the signal A fields HE-SIGA of the HE long preamble frame. Table 202 lists the structure inside the first HE-SIGA1 symbol. For example, HE-SIGA1 symbol includes a one-bit MU/SU field, a one-bit STBC field, a one-bit reserved field, a two-bit bandwidth (BW), a two-bit number of STS ($N_{STS}$), a nine-bit partial AID, a one-bit short guard interval, a two-bit coding, a four-bit MCS index, and a one-bit beam-change indication. The one-bit beam-change indication field indicates whether the beam steering matrices Q(k) have been changed. For example, a value of zero (0) indicates that the beam steering matrices are identical, and a value of one (1) indicates that the beam steering matrices have been changed across Omni and Data portions of the long preamble. Note that the beam-change indication bit can also be used as an indication for channel smoothing. For one spatial stream, if beam-change indication bit is set to zero, the receiver may do channel smoothing. Otherwise, smoothing is not recommended.

Figure 3:
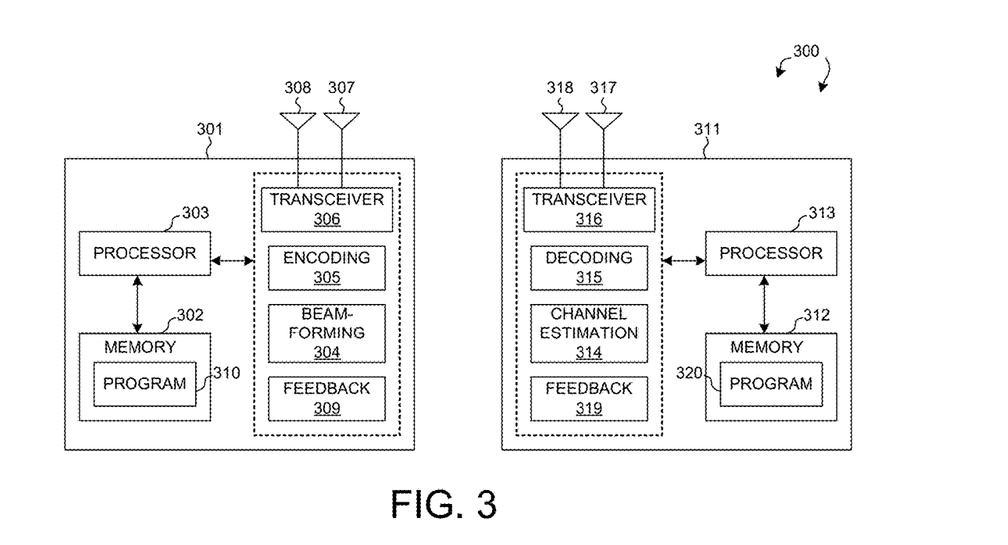
FIG. 3 is a simplified block diagram of a wireless transmitting device and a receiving device in accordance with a novel aspect.

FIG. 3 is a simplified block diagram of wireless devices 301 and 311 in accordance with a novel aspect. For wireless device 301, antennae 307 and 308 transmit and receive radio signals. RF transceiver module 306, coupled with the antennae, receives RF signals from the antennae, converts them to baseband signals and sends them to processor 303. RF transceiver 306 also converts received baseband signals from the processor, converts them to RF signals, and sends out to antennae 307 and 308. Processor 303 processes the received baseband signals and invokes different functional modules to perform features in wireless device 301. Memory 302 stores program instructions and data 310 to control the operations of the wireless device.

Similar configuration exists in wireless device 311 where antennae 317 and 318 transmit and receive RF signals. RF transceiver module 316, coupled with the antennae, receives RF signals from the antennae, converts them to baseband signals and sends them to processor 313. The RF transceiver 316 also converts received baseband signals from the processor, converts them to RF signals, and sends out to antennae 317 and 318. Processor 313 processes the received baseband signals and invokes different functional modules to perform features in wireless device 311. Memory 312 stores program instructions and data 320 to control the operations of the wireless device.

The wireless devices 301 and 311 also include several functional modules to perform embodiments of the present invention. In the example of FIG. 3, wireless device 301 is a transmitting device that includes an encoder 305, a beamforming module 304, and a feedback module 309. Wireless device 311 is a receiving device that includes a decoder 315, a channel estimation module 314, and a feedback module 319. Note that a wireless device may be both transmitting and receiving device. The different functional modules and circuits can be implemented by software, firmware, hardware, or any combination thereof. The function modules and circuits, when executed by the processors 303 and 313 (e.g., via executing program codes 310 and 320 inside memory), allow transmitting device 301 and receiving device 311 to perform embodiments of the present invention.

In one example, at the transmitter side, device 301 generates multiple fields of a long preamble frame via various steps (e.g., apply beamforming/precoding over different training fields), and inserts a beam-change indication bit in a signal field of the long preamble frame. Device 301 then transmits the long preamble frame to the receiver. At the receiver side, device 302 receives the long preamble frame, performs channel estimation using the different training fields, and decodes the beam-change indication bit. For example, a value of 1 indicates that Q matrix is changed, while a value of 0 indicates Q matrix is unchanged and receiver should be safe to combine L-LTF and HE-LTF. If the beam-change indication bit is equal to one, then the receiver does not perform channel estimation enhancement because channel condition has changed between the different training fields. On the other hand, if the beam-change indication bit is equal to zero, then the receiver performs channel estimation enhancement by combining the channel estimation results from the different training fields because channel condition remains the same for the transmission of the different training fields. Various embodiments of such transmitting device and receiving device are now described below with details and accompany drawings.

Figure 4:
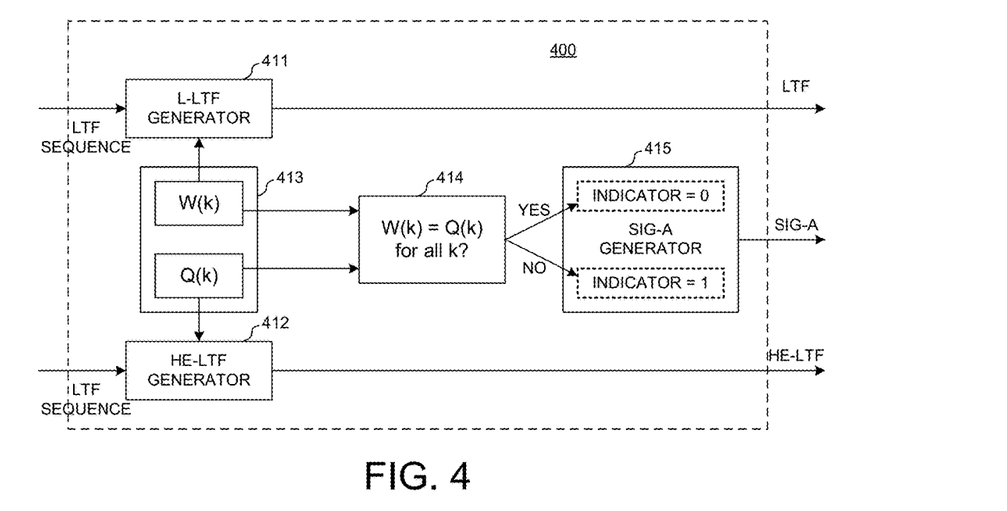
FIG. 4 is a diagram of a transmitting device that inserts a beam-change indicator.

FIG. 4 is a simplified diagram of a transmitting device 400 that inserts a beam-change indicator. Only relevant components pertinent to the present invention are illustrated below, while other irrelevant components are omitted. Transmitting device 400 comprises an L-LTF generator 411, a HE-LTF generator 412, a beamforming module 413, a comparator 414, and a SIG-A generator 415. The transmitting device 400 first generates various training fields including L-LTF and HE-LTF and SIG-A according to the following steps. L-LTF generator 411 takes a predefined LTF training sequence in the frequency domain, applies appropriate phase rotation, applies Cyclic Shift Diversity (CSD) for each space-time stream and frequency segment, applies precoding using a beam-steering matrices W(k) for each subcarrier, performs Inverse Discrete Fourier Transform (IDFT), adds guard interval (GI), and sends resulted LTF symbol(s) to analog and RF module for further processing. Similarly, HE-LTF generator 412 takes the same predefined LTF training sequence in the frequency domain, applies appropriate phase rotation, applies CSD for each space-time stream and frequency segment, applies precoding using a beam-steering matrices Q(k) for each subcarrier, performs IDFT, adds GI, and sends resulted HE-LTF symbol(s) to analog and RF module for further processing. The beam-steering matrices W(k) and Q(k) are determined by beamforming module 413 dynamically. For example, an identity matrix may be used to achieve omnidirectional transmission, while a beamforming matrix with precoding weighting may be used to achieve directional transmission for MIMO systems based on previous channel sounding feedback information.

After beamforming, transmitting device 400 then determines whether channel condition is changed between L-LTF and HE-LTF symbol transmission. Comparator 414 compares the beam-steering matrices W(k) and Q(k) for each subcarrier. If W(k)=Q(k) for all subcarrier, then the channel condition has not changed and SIG-A generator 415 inserts a beam-change indication bit=zero into the SIG-A field. On the other hand, if W(k)≠Q(k) for at least one of the subcarriers, then the channel condition has changed. SIG-A generator 415 inserts a beam-change indication bit=one into the SIG-A field. In the upcoming IEEE 802.11ax standard, the SIG-A field is composed of two OFDM symbols, SIG-A1 and SIG-A2, each containing 24 data bits. The bits in SIG-A are coded, inter-leaved, and modulated into two OFDM symbols. Finally, the L-LTF, HE-SIG-A, and HE-LTF are encoded into a long preamble frame and transmitted to a corresponding receiving device.

Figure 5:
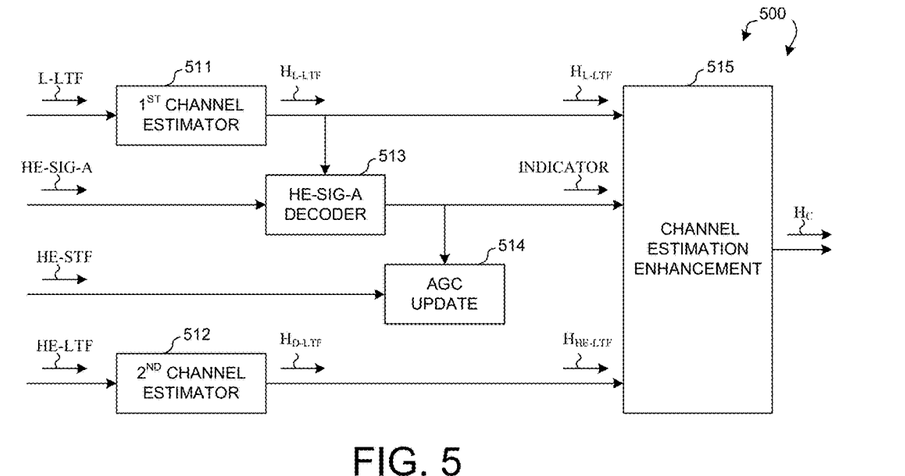
FIG. 5 is a first embodiment of a receiving device that performs channel estimation enhancement for one spatial stream based on a beam-change indicator.

FIG. 5 is a first embodiment of a receiving device 500 that performs channel estimation enhancement for single spatial stream based on a beam-change indicator. Receiving device 500 comprises a first channel estimator 511, a second channel estimator 512, a HE-SIG-A decode 513, an AGC update module 514, and a channel estimation enhancement module 515. When a long preamble frame arrives at the receiver side, device 500 receives the long preamble frame in the order of the frame structure. Typically, device 500 receives the long preamble frame in the order of L-STF, L-LTF, L-SIG, RL-SIG, HE-SIGA1, HE-SIGA2, HE-STF, HE-LTF, and data in OFDM symbols, and processes the received OFDM symbols of the long preamble frame in the same order accordingly.

A first channel estimation is performed based on the received L-LTF symbols by first channel estimator 511. As a result, a first channel response matrix $H_{L-LTF}$ is generated, which represents the corresponding channel condition for L-STF, L-LTF, and L-SIG symbol transmission. The first channel response matrix $H_{L-LTF}$ is output to channel estimation enhancement module 515. Next, SIG-A decoder 513 uses $H_{LTF}$ to decode the HE-SIGA1 field, and thereby obtains a beam-change indicator value. The beam-change indicator is also output to channel estimation enhancement module 515. In addition, device 500 also uses the indicator to determine whether to perform AGC update by AGC update module 514 over received D-STF symbol. This is because if channel condition has changed from the D-STF symbol, then device 500 needs to perform AGC update for changed signal level. Otherwise, if channel condition has not changed from the HE-STF symbol, no AGC update is necessary. Next, a second channel estimation is performed over received HE-LTF symbols by second channel estimator 512. As a result, a second channel response matrix $H_{D-LTF}$ is generated, which represents the corresponding channel condition for HE-STF, HE-LTF, and data symbol transmission. The second channel response matrix $H_{HE-LTF}$ is also output to channel estimation enhancement module 515.

When beam-change indicator is zero, e.g., the beam-steering matrices W(k) and Q(k) are the same for all subcarriers, then channel estimation enhancement may be performed. The reason is that if the channel condition has not changed between the transmission of L-LTF and HE-LTF symbols, then both L-LTF and HE-LTF symbols may be used to increase the accuracy of channel estimation. In the embodiment of FIG. 5, channel estimation enhancement is performed by combining the first channel response matrix $H_{L-LTF}$ and the second channel response matrix $H_{HE-LTF}$ as the follow equation:

$$Hc(k) = \frac{2*H(k)_{L-LTF} + H(k)_{HE-LTF1}}{3}$$

where
  $H_C(k)$ is the final combined channel response matrix of data transmission for the $k^{th}$ subcarrier
  $H(k)_{L-LTF}$ is the channel response matrix based on two LTF symbols for the $k^{th}$ subcarrier
  $H(k)_{HE-LTF1}$ is the channel response matrix based on the first HE-LTF symbol for the $k^{th}$ subcarrier In the above equation, the L-LTF occupies two OFDM symbol, while the HE-LTF occupies one OFDM symbol. Traditionally, the channel response matrix is estimated only based on the HE-LTF symbol. As a result, the proposed channel enhancement method provides a 4.7 dB gain on channel estimation performance.

Figure 6:
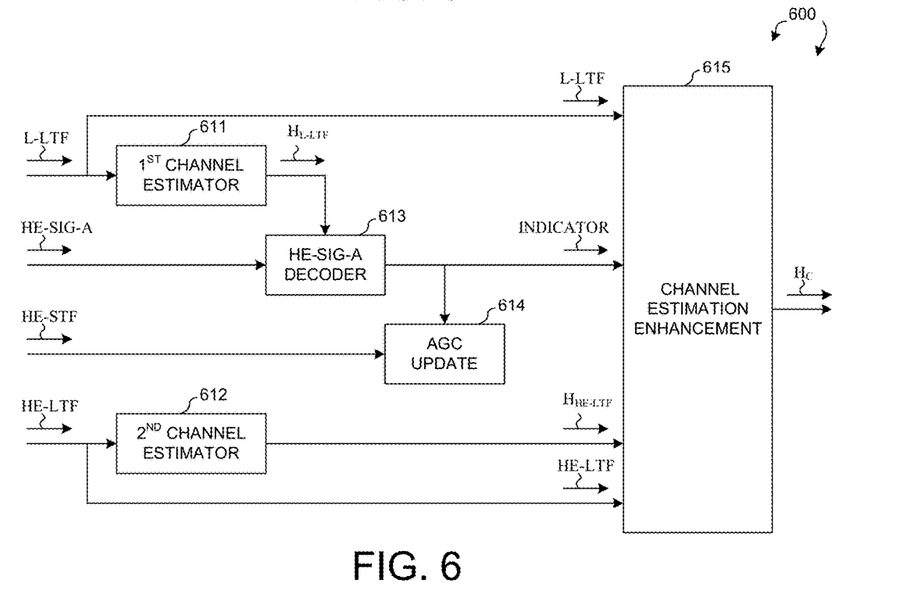
FIG. 6 is a second embodiment of a receiving device that performs channel estimation enhancement for one spatial stream based on a beam-change indicator.

FIG. 6 is a second embodiment of a receiving device 600 that performs channel estimation enhancement for single spatial stream based on a beam-change indicator. Receiving device 600 is similar to receiving device 500 of FIG. 5, which comprises a first channel estimator 611, a second channel estimator 612, a HE-SIG-A decode 613, an AGC update module 614, and a channel estimation enhancement module 615. Similar to FIG. 5, when beam-change indicator is zero, e.g., the beam-steering matrices W(k) and Q(k) are the same for all subcarriers, then channel estimation enhancement may be performed. In the embodiment of FIG. 6, the channel estimation enhancement may be achieved by performing channel estimation based on the L-LTF and the HE-LTF symbols directly.

As illustrated in FIG. 6, channel estimation enhancement module 615 takes received L-LTF symbols, received HE-LTF symbol(s), the beam-change indicator, and the channel response matrix $H_{HE-LTF}$ as inputs. If the beam-change indicator is set to one, then no channel estimation enhancement is performed, and the final combined channel response matrix $H_C = H_{HE-LTF}$. On the other hand, if the beam-change indicator is set to zero, then channel estimation is performed based on two LTF symbols and one HE-LTF1 symbol directly to obtain the final combined channel response matrix $H_C$. As a result, the proposed channel enhancement method also provides a 4.7 dB gain on channel estimation performance as in FIG. 5.

Figure 7:
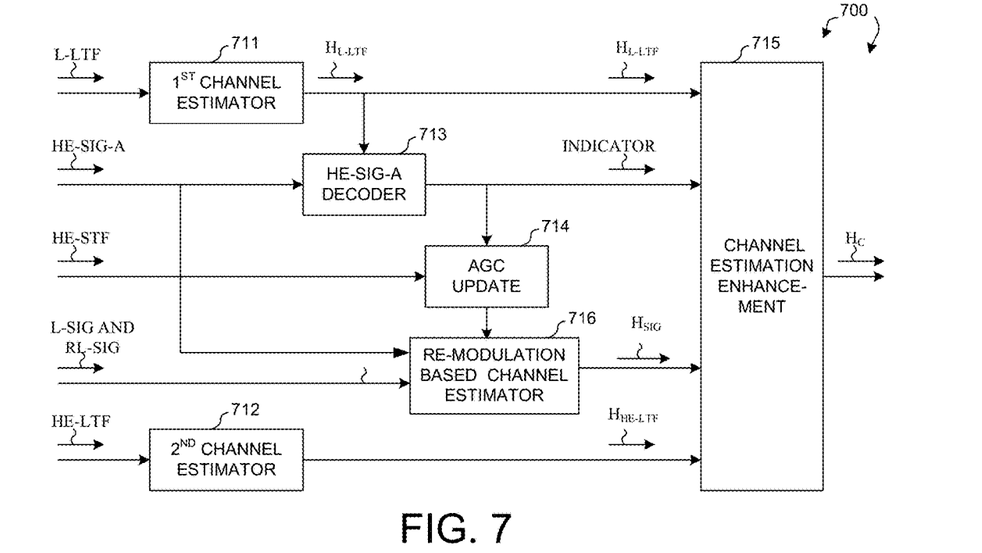
FIG. 7 is a third embodiment of a receiving device that performs channel estimation enhancement for HE PPDU based on a beam-change indicator.

FIG. 7 is a third embodiment of a receiving device 700 that performs channel estimation enhancement for IEEE 802.11ax high efficiency (HE) PPDU based on a beam-change indicator. Receiving device 700 is similar to receiving device 500 of FIG. 5, which comprises a first channel estimator 711, a second channel estimator 712, a HE-SIG-A decode 713, an AGC update module 714, and a channel estimation enhancement module 715. In addition, receiving device 700 comprises a third channel estimator 716 for further performance improvement of channel estimation. The third channel estimator 716 is a re-modulation based channel estimator. When beam-change indicator is zero, e.g., the beam-steering matrices W(k) and Q(k) are the same for all subcarriers, then channel estimation enhancement may be performed. The reason is that if the channel condition has not changed for the transmission of L-LTF, L-SIG, RL-SIG, HE-SIGA, and HE-LTF symbols, then not only the received L-LTF and HE-LTF symbols may be used to increase the accuracy of channel estimation, the received L-SIG, RL-SIG, and HE-SIGA symbols may also be used to improve the channel estimation accuracy. If L-SIG, RL-SIG and two HE-SIGA symbols are also used for channel estimation combination, we can expect about 8 dB gains on channel estimations enhancement. Interpolation is needed for L-LTFs, L-SIG, RL-SIG and HE-SIGAs when they are used for channel estimation enhancement because the HE-LTF/Data has 4× number of subcarriers.

Figure 8:
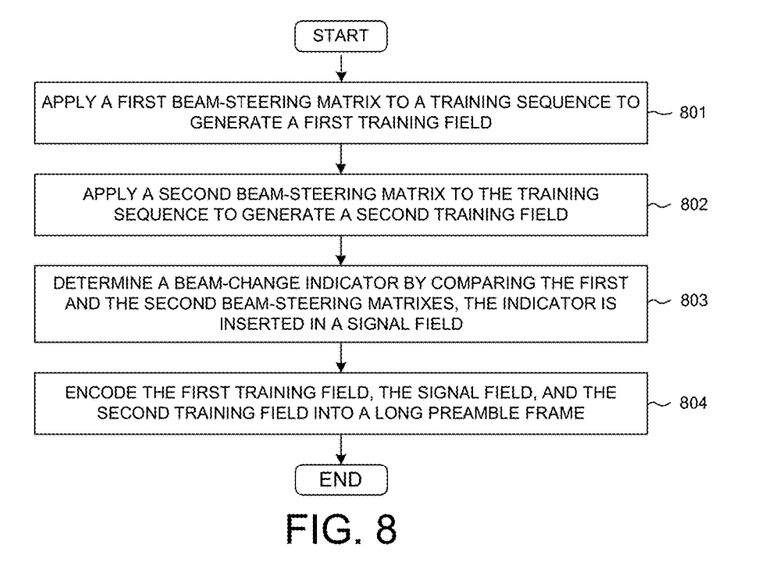
FIG. 8 is flow chart of a method of transmitting and encoding a long preamble frame with a beam-change indicator in accordance with a novel aspect.

In the embodiment of FIG. 7, HE-SIGA, L-SIG and RL-SIG is also taken into account for channel estimation enhancement. That is, the sub-channels corresponding to subcarriers that are non-zero in those symbols can be estimated by regarding them as channel estimation training sequence. Denote such subcarriers as $k_{SIG}$, which is a subset of all subcarriers, then the third channel estimator 716 performs channel estimation based on HE-SIGA, L-SIG and RL-SIG and generates a third channel response matrix $H_{HE-SIG}$ for those subcarriers $k_{SIG}$. The final combined channel response matrix $H_C(k_{SIG})$ may be represented as the following equation:

$$Hc(k_{SIG}) = \frac{2*H(k_{SIG})_{L-LTF} + 4*H(k_{SIG})_{SIG} + H(k_{SIG})_{HE-LTF1}}{7}$$

where
  $H_C(k_{STF})$ is the final combined channel response matrix of data transmission for the $k_{STF}$ subcarrier
  $H(k_{STF})_{L-LTF}$ is the channel response matrix based on two L-LTF symbols for the $k_{SIG}$ subcarrier
  $H(k_{SIG})_{SIG}$ is the channel response matrix based on the L-SIG symbol, RL-SIG symbol, and two HE-SIGA symbols for the $k_{SIG}$ subcarrier
  $H(k_{STF})_{HE-LTF1}$ is the channel response matrix based on the first HE-LTF symbol for the $k_{SIG}$ subcarrier FIG. 8 is flow chart of a method of transmitting and encoding a long preamble frame with a beam-change indicator in accordance with a novel aspect. In step 801, a wireless device applies a first beam-steering matrix to a training sequence and generates a first training field. In step 802, the wireless device applies a second beam-steering matrix to the training sequence and generates a second training field. In step 803, the device determines a beam-change indication bit by comparing the first and the second beam-steering matrices for all subcarriers. If the matrices are the same for all subcarriers, then the beam-change indication bit is set to zero. Otherwise, it is set to one. The beam-change indicator bit is then inserted into a signal field. In step 804, the device encodes the first training field, followed by the signal field, followed by the second training field into a long preamble frame to be transmitted to a receiving device.

Figure 9:
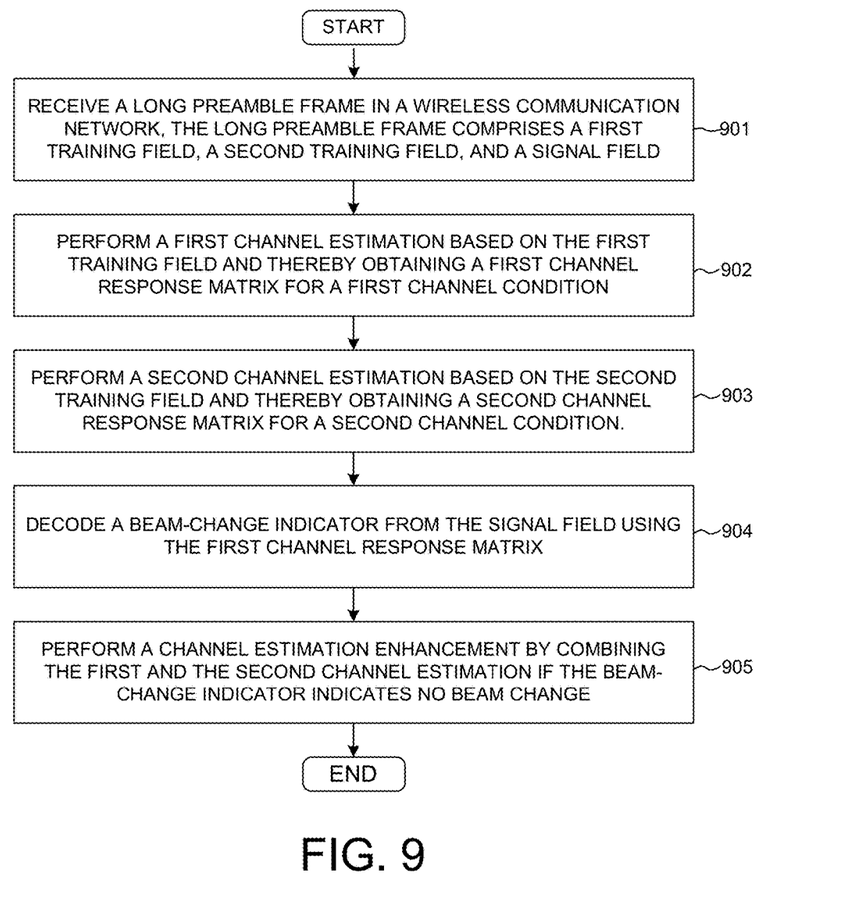
FIG. 9 is a flow chart of a method of receiving a long preamble frame and perform channel estimation enhancement in accordance with a novel aspect.

FIG. 9 is a flow chart of a method of receiving a long preamble frame and perform channel estimation enhancement in accordance with a novel aspect. In step 901, a wireless device receives a long preamble frame. The long preamble frame comprises a first training field, a second training field, and a signal field. In step 902, the device performs a first channel estimation based on the first training field and obtains a first channel response matrix for a first channel condition. In step 903, the device performs a second channel estimation based on the second training field and obtains a second channel response matrix for a second channel condition. In step 904, the device decodes a beam-change indication bit from the signal field using the first channel response matrix. In step 905, the device performs channel estimation enhancement by combining the first channel estimation and the second channel estimation results if the beam-change indication indicates no beam change between the first channel condition and the second channel condition.

The above illustration mainly focuses on single spatial stream. Channel estimation enhancement for multiple spatial stream can also be achieved via the use of beam-change indication. At the transmitter, for two spatial streams, there are two usage scenarios. In a first scenario, when the beam-change indication is set as zero, then it indicates the two spatial streams in the pre-HE portion and HE portion are spatially expanded using the same CSD (cyclic shift diversity) values without beamforming. In a second scenario, when the beam-change indication is set as zero, then it indicates the two spatial streams in the pre-HE portion and HE portion are beamformed and applied with the same Q matrix. In IEEE 802.11ax, 6 symbols (L-LTF, re-modulated L-SIG, RL-SIG, and HE-SIGAs symbols) can be used to update HE channel estimation. For example, for two spatial streams, the CE noise power reduction is more than 2 dB. For four spatial streams, the CE noise power reduction is more than 1 dB. Interpolation is needed for L-LTFs, L-SIG, RL-SIG, and HE-SIGAs when they are used for channel estimation enhancement because the HE-LTF and data has 4× number of subcarriers.

Figure 10:
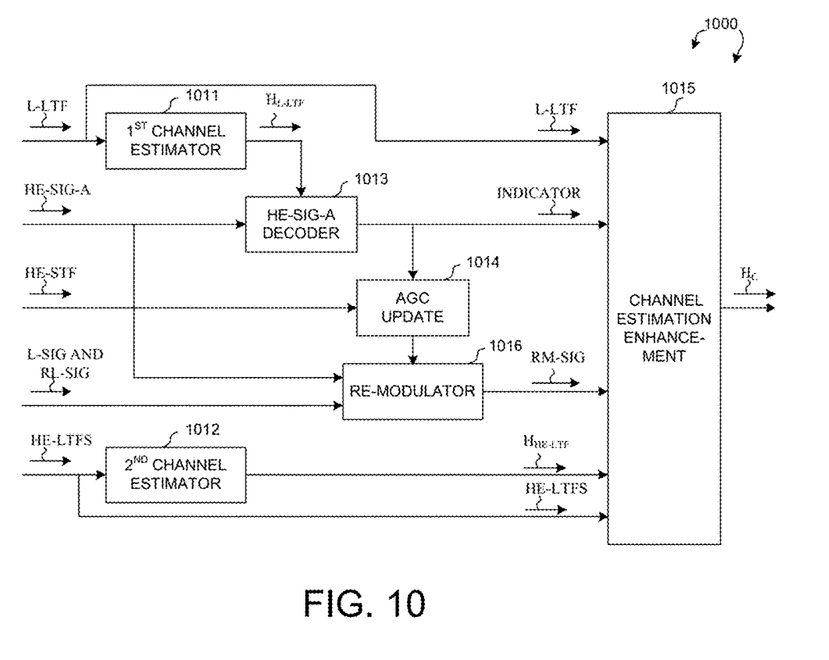
FIG. 10 is one embodiment of a receiving device that performs channel estimation enhancement for HE PPDU over one or multiple spatial streams based on a beam-change indicator in accordance with one novel aspect.

FIG. 10 is one embodiment of a receiving device that performs channel estimation enhancement for HE PPDU over one or multiple spatial streams based on a beam-change indicator in accordance with one novel aspect. Receiving device 1000 comprises a first channel estimator 1011, a second channel estimator 1012, a HE-SIG-A decode 1013, an AGC update module 1014, and a channel estimation enhancement module 1015. In addition, receiving device 1000 comprises a re-modulator 1016 for further performance improvement of channel estimation. When beam-change indicator is zero, e.g., the beam-steering matrices W(k) and Q(k) are the same for all subcarriers, then channel estimation enhancement may be performed.

The reason is that if the channel condition has not changed for the transmission of L-LTF, HE-STF, and HE-LTF symbols, then not only the received L-LTF and HE-LTF symbols may be used to increase the accuracy of channel estimation, the received L-SIG, RL-SIG, and two HE-SIGA symbols may also be used to improve the channel estimation accuracy. If L-SIG, RL-SIG and two HE-SIGA symbols are also used for channel estimation combination, we can expect about 8 dB gains on channel estimations enhancement for single spatial stream. For multiple spatial streams, multiple HE-LTF symbols exist in the HE PPDU frame. The channel estimation enhancement for multiple spatial streams is relatively smaller.

In the example of FIG. 10, L-SIG, RL-SIG and two HE-SIGA symbols are re-modulated by re-modulator 1016 to output $R_{SIG}$. A total of six symbols (two L-LTF symbols, re-modulated L-SIG symbol, re-modulated RL-SIG symbol, and re-modulated two HE-SIGA symbols) can all be used to update the channel estimation. The channel estimation enhancement module 1015 takes the input of the re-modulated symbols (RM-SIG), the L-LTF, the one or multiple HE-LTFs, and the original channel response matrix ($H_{HE-LTF}$), and outputs a final enhanced channel response matrix $H_C$ after for channel estimation enhancement.

Figure 11A:
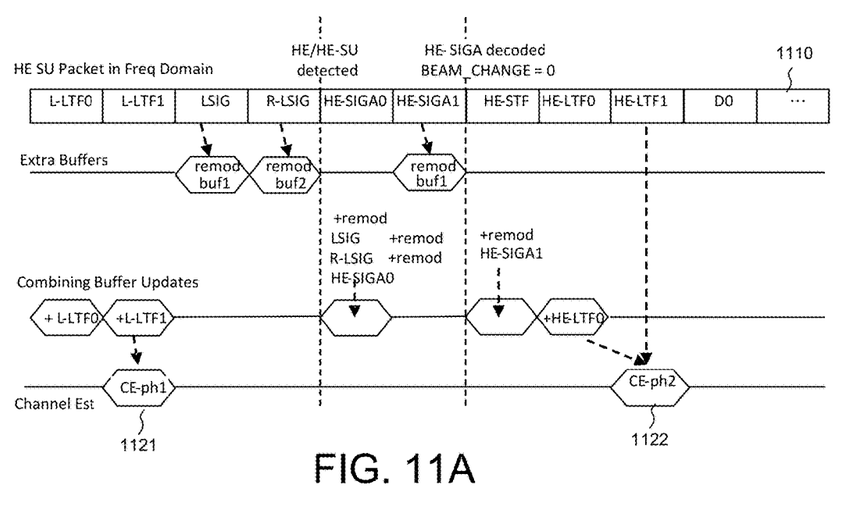
FIG. 11A illustrates the receiver channel estimation process using beam-change indication to enhance channel estimation quality for HE SU PPDU for two spatial layers.

FIG. 11A illustrates the receiver channel estimation process using beam-change indication to enhance channel estimation quality for HE SU PPDU 1110 for two spatial layers. Two HE-LTFs (HE-LTF0 and HE-LTF1) are depicted for two spatial layers. A receiver estimates the channels the channels for multiple 20 MHz channels (if bandwidth is larger than 20 MHz) using L-LTFS. A receiver decodes the L-SIG, RL-SIG and HE-SIGAs for multiple 20 MHz channels (if bandwidth is larger than 20 MHz). A receiver needs to make sure CRC check for all the SIG files correct before performing channel estimation enhancement. As illustrated in FIG. 11A, a receiver needs to buffer L-LTFs, L-SIG, RL-SIG and HE-SIGAs. The receiver checks the beam-change indication bit from the HE-SIGA1 field. If the beam-change indication bit indicates there is no beam change, then: Step#1: the receiver does not update AGC, other RF and analog settings during HE-STF; Step#2: The receiver estimates the channels using L-LTFS, and re-modulated L-SIG, RL-SIG, HE-SIGAs and do the interpolation—Re-encode is needed for L-SIG, RL-SIG and HE-SIGAs; Step#3: The receiver combines the channel estimations from HE-LTF0 and HE-LTF1 and channel estimations from step#2 to enhance the final channel estimation.

At the receiver, since the pre-HE portion and the $1^{st}$ HE-LTF symbol both use the $1^{st}$ column of P matrix, the channel estimation (CE) combines the pre-HE symbols and the $1^{st}$ HE-LTF symbol to reduce noise on the combined $1^{st}$ HE-LTF symbol, and therefore enhances channel estimation quality. Assume kth sub-carrier's noise power is 1 in any of HE-LTF symbols at a receiver. Without using combining, CE is based on the two HE-LTF symbols, and the resulted noise power in each of the estimated channel matrix element is $(1+1)/2^2=0.5$. By combining N pre-HE symbols into the $1^{st}$ HE-symbol, the noise power on the combined $1^{st}$ HE-LTF is reduced from 1 to $1/(N+1)$, and the resulted noise power in each of the estimated channel matrix element becomes $[1/(N+1)+1]/2^2$. Therefore, we can say combining pre-HE portion reduces CE noise power by $10*\log 10(2/(1+1/(N+1)))$ dB. If N=6, then the CE noise power is reduced by 2.43 dB by using combining.

Figure 11B:
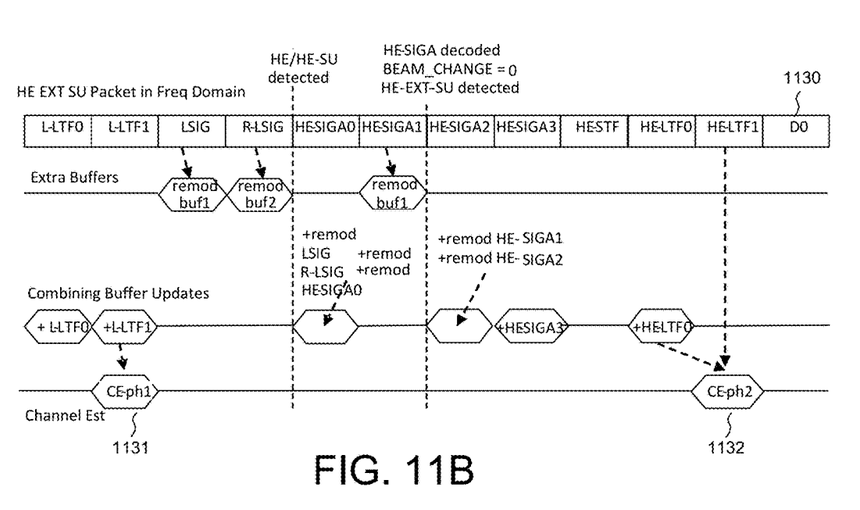
FIG. 11B illustrates the receiver channel estimation process using beam-change indication to enhance channel estimation quality for HE EXT SU PPDU for two spatial layers.

FIG. 11B illustrates the receiver channel estimation process using beam-change indication to enhance channel estimation quality for HE EXT SU PPDU 1130 for two spatial layers. FIG. 11B is similar as FIG. 11A. The only difference is that the PPDU is for HE-EXT-SU with more HE-SIGA fields.

In one example, from legacy preamble to HE portions, there are no beamforming and CSD changes from $T_{CS-L}$ to $T_{CS-H}$. We have:

$$\delta_L = e^{-j2\pi \cdot k \cdot \Delta F \cdot T_{CS-L}}$$

$$\delta_H = e^{-j2\pi \cdot k \cdot \Delta F \cdot T_{CS-L}}$$

$$\Delta = \delta_L \cdot \delta_H^*$$

The received legacy symbols are:

$$y_i = H \cdot \begin{bmatrix} s_i \\ \delta_L \cdot s_i \end{bmatrix} + n_i$$

Where
$s_i$, i=0, 1 are for L-LTF symbols
$s_i$ i=2-5 are for L-SIG, and HE-SIGA symbols. They can be obtained by re-encode and re-modulate the decoded L-SIG and HE-SIGA symbols
After modulation is removed, combine all 6 legacy symbols as $$y'_c = \sum_{i=0}^{5} y_i \cdot s_i^* = H \begin{bmatrix} 6 \\ 6\delta_L \end{bmatrix} + \sum_{i=0}^{5} n_i = H \begin{bmatrix} 6 \\ 6\delta_L \end{bmatrix} + \sqrt{6}\, n'_c$$

The received HE-LTF symbols are $$[y_{HE-LTF0}\ y_{HR-LTF1}] = H \cdot \begin{bmatrix} 1 & 0 \\ 0 & \delta_H \end{bmatrix} \cdot P \cdot s_{HE-LTF} + [n_{HE-LTF0}\ n_{HR-LTF1}]$$

$$[y'_{HE-LTF0}\ y'_{HE-LTF1}] = H \cdot \begin{bmatrix} 1 & -1 \\ \delta_H & \delta_H \end{bmatrix} + [n'_{HE-LTF0}\ n'_{HE-LTF1}]$$

The initial HE channel estimation:

$$\tilde{H} = H \cdot \begin{bmatrix} 1 & 0 \\ 0 & \delta_H \end{bmatrix}$$

$$\tilde{H} + [n'_{HE-LTF0}\ n'_{HE-LTF1}] \cdot P' = [y_{HE-LTF0}\ y_{HE-LTF1}] \cdot P'$$

Where
All n are AWGN with unit power, noise power for initial each estimated channel entry is $N_{i0}=N_{i1}=0.5$.
Combing legacy symbols and HE-LTF symbols:

$$[y'_c\ y'_{HE-LTF0}\ y'_{HE-LTF1}] = H \cdot \begin{bmatrix} 1 & 0 \\ 0 & \delta_H \end{bmatrix} \cdot P_c + [\sqrt{6}\, n'_c\ n'_{HE-LTF0}\ n'_{HE-LTF1}]$$

$$P_c = \begin{bmatrix} 6 & 1 & -1 \\ 6\Delta & 1 & 1 \end{bmatrix}$$

$$P_c^{-1} = P_c^* \cdot (P_c \cdot P_c^*)^{-1} = \frac{1}{74} \cdot \begin{bmatrix} 6 & 6\Delta^* \\ 19-18\Delta & 19-18\Delta^* \\ -19-18\Delta & 19+18\Delta^* \end{bmatrix}$$

The updated HE channel estimation:

$$\hat{H} + [\sqrt{6}\, n'_c, n'_{HD-LTF0} n'_{HD-LTF1}] \cdot P_c^{-1} = [y'_c\, y'_{HE-LTF0}\, y'_{HE-LTF1}] \cdot P_c^{-1}$$

Where
All n are AWGN with unit power, noise power for combined $\hat{H}_{ij}$ are $$N_{i,0} = \frac{1}{74^2} \cdot (36 \cdot 6 + |19-18\Delta|^2 + |19+18\Delta|^2)$$

$$N_{i,1} = \frac{1}{74^2} \cdot (36 \cdot 6 + |19-18\Delta^*|^2 + |19+18\Delta^*|^2)$$

Because of $|\Delta|^2=1$, we can derive that $N_{i,0}=N_{i,1}=0.2896$
It can be shown that for the updated HE-Channel estimation, the noise is reduced by 2.37 dB (compared to $N_{i0}=N_{i1}=0.5$)
For the case that preamble is also beamformed, it is a special case with $\Delta=1$.

Figure 12:
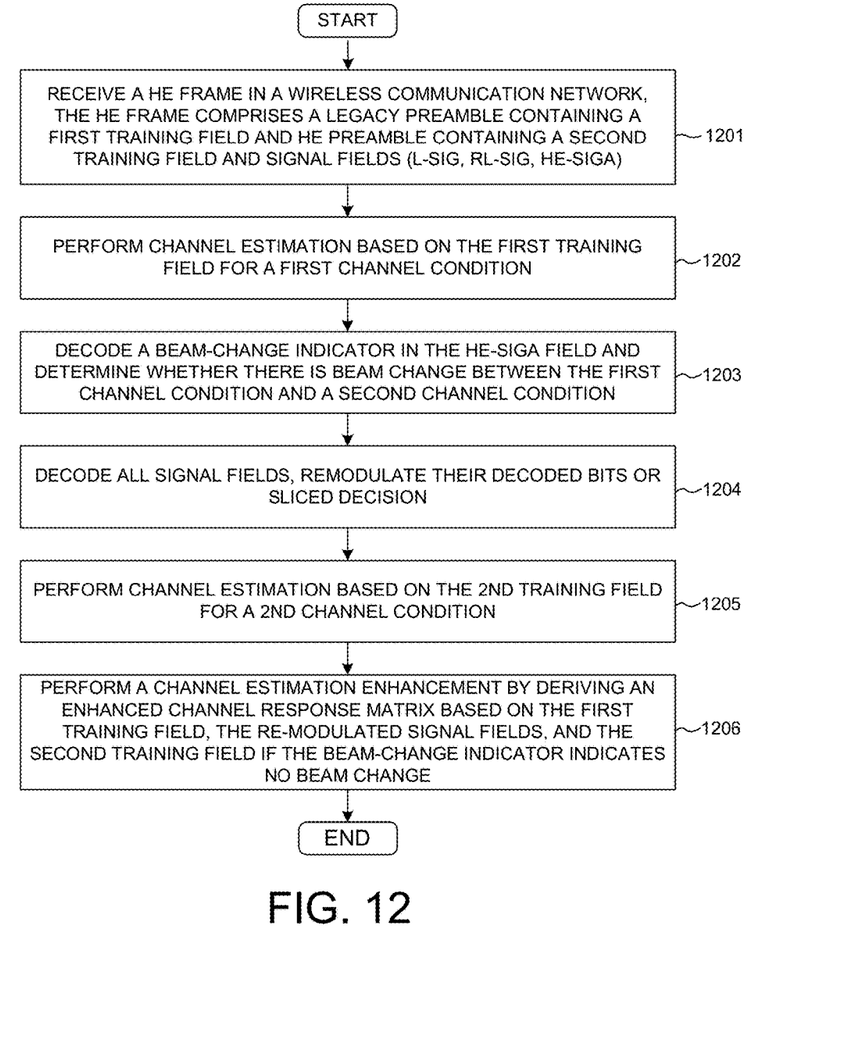
FIG. 12 is a flow chart of a method of transmitting and encoding a HE PPDU with a beam-change indicator in accordance with one novel aspect.

FIG. 12 is a flow chart of a method of receiving and encoding a HE PPDU with a beam-change indicator in accordance with one novel aspect. In step 1201, a wireless device receives a high efficiency (HE) frame in a wireless communication network. The HE frame comprises a legacy preamble containing a first training field and a HE preamble containing a signal field and a second training field. In step 1202, the wireless device performs channel estimation based on the first training field for a first channel condition associated with the legacy preamble. In step 1203, the wireless device decodes a beam-change indicator in the signal field and determines whether there is beam change between the first channel condition and a second channel condition associated with the HE preamble. In step 1204, the wireless device decodes all signal fields and re-modulates their decoded bits or sliced decision. In step 1205, the wireless device performs channel estimation based on the second training field for the second channel condition. Finally, in step 1206, the wireless device performs a channel estimation enhancement by deriving an enhanced channel response matrix based on both the first training field, the modulated signal fields, and the second training field if the beam-change indicator indicates no beam change between the first channel condition and the second channel condition.

Figure 13:
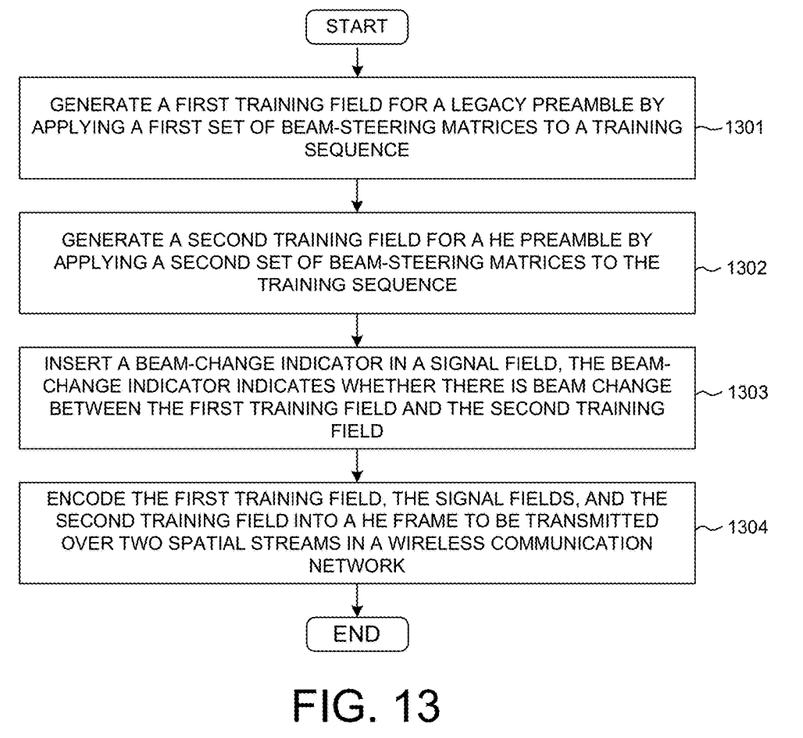
FIG. 13 is a flow chart of a method of receiving a HE PPDU and perform channel estimation enhancement in accordance with a novel aspect.

FIG. 13 is a flow chart of a method of transmitting a HE PPDU and perform channel estimation enhancement in accordance with a novel aspect. In step 1301, a wireless device generates a first training field for a legacy preamble by applying a first set of beam-steering matrices to a training sequence. In step 1302, the wireless device generates a second training field for a high efficiency (HE) preamble by applying a second set of beam-steering matrices to the training sequence. In step 1303, the wireless device inserts a beam-change indicator in a signal field. The beam-change indicator indicates whether there is beam change between the first training field and the second training field. In step 1304, the wireless device encodes the first training field, the signal field, and the second training field into a high efficiency (HE) frame to be transmitted over two spatial streams in a wireless communication network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a high efficiency (HE) frame in a wireless communication network by a wireless device, wherein the HE frame comprises:
      a legacy preamble comprising a first training field; and
      a HE preamble comprising a signal field and a second training field, wherein the HE frame further comprises a plurality of signal fields including the signal field;
   performing channel estimation based on the first training field for a first channel condition and based on the second training field for a second channel condition;
   decoding a beam-change indicator in the signal field and determining whether there is a beam change between the first channel condition and the second channel condition; and
   performing a channel estimation enhancement by using the first training field, the second training field, and processed signal fields that correspond to the plurality of signal fields to derive an enhanced channel response matrix if the beam-change indicator indicates no beam change.

2. The method of claim 1, wherein the wireless device performs said performing the channel estimation and said decoding the beam-change indicator over every 20 MHz sub-channel if a total bandwidth is larger than 20 MHz.

3. The method of claim 1, wherein said receiving comprises receiving the HE frame over two spatial streams.

4. The method of claim 3, wherein the beam-change indicator indicates the two spatial streams in the legacy preamble and the HE preamble are spatially expanded using same CSD (cyclic shift diversity) value without beamforming.

5. The method of claim 3, wherein the beam-change indicator indicates the two spatial streams in the legacy preamble and the HE preamble are applied with the same beamforming matrix.

6. The method of claim 1, wherein said performing the channel estimation enhancement comprises using two orthogonal frequency division multiplexing (OFDM) symbols of the first training field to derive the enhanced channel response matrix.

7. The method of claim 1, wherein the legacy preamble comprises a legacy long training field (L-LTF), a legacy signal field (L-SIG), and a repeated L-SIG (RL-SIG), wherein the HE preamble comprises a high efficiency signal field (HE-SIGA), and wherein said performing the channel estimation enhancement comprises using the L-LTF, the L-SIG, the RL-SIG, and the HE-SIGA to derive the enhanced channel response matrix.

8. The method of claim 7, further comprising decoding and re-modulating, by the wireless device, the L-SIG, the RL-SIG, and the HE-SIGA before said performing the channel estimation enhancement.

9. The method of claim 1, further comprising using, by the wireless device, the beam-change indicator to determine whether to perform an automatic gain control update.

10. A wireless device, comprising:
    a receiver operable to receive a high efficiency (HE) frame in a wireless communication network, wherein the HE frame comprises:
       a legacy preamble comprising a first training field; and
       a HE preamble comprising a signal field and a second training field, wherein the HE frame further comprises a plurality of signal fields including the signal field;
    a channel estimator operable to perform channel estimation based on the first training field for a first channel condition and based on the second training field for a second channel condition;
    a decoder operable to decode a beam-change indicator in the signal field and operable to determine whether there is a beam change between the first channel condition and the second channel condition; and
    an enhanced channel estimator operable to perform a channel estimation enhancement by using the first training field, the second training field, and processed signal fields that correspond to the plurality of signal fields to derive an enhanced channel response matrix if the beam-change indicator indicates no beam change.

11. The wireless device of claim 10, wherein the channel estimator performs the channel estimation and the decoder decodes the beam-change indicator over every 20 MHz sub-channel if a total bandwidth is larger than 20 MHz.

12. The wireless device of claim 10, wherein the receiver receives the HE frame over two spatial streams.

13. The wireless device of claim 12, wherein the beam-change indicator indicates the two spatial streams in the legacy preamble and the HE preamble are spatially expanded using same CSD (cyclic shift diversity) value without beamforming.

14. The wireless device of claim 12, wherein the beam-change indicator indicates the two spatial streams in the legacy preamble and the HE preamble are applied with the same beamforming matrix.

15. The wireless device of claim 10, wherein the enhanced channel estimator is further operable to perform the channel estimation enhancement by using two orthogonal frequency division multiplexing (OFDM) symbols of the first training field to derive the enhanced channel response matrix.

16. The wireless device of claim 10, wherein the legacy preamble comprises a legacy long training field (L-LTF), a legacy signal field (L-SIG), and a repeated L-SIG (RL-SIG), wherein the HE preamble comprises a high efficiency signal field (HE-SIGA), and wherein the enhanced channel estimator is further operable to perform the channel estimation enhancement by using the L-LTF, the L-SIG, the RL-SIG, and the HE-SIGA to derive the enhanced channel response matrix.

17. The wireless device of claim 16, further comprising a module operable to decode and re-modulate the L-SIG, the RL-SIG, and the HE-SIGA before the enhanced channel estimator performs the channel estimation enhancement.

18. The wireless device of claim 10, wherein the beam-change indicator is usable to determine whether to perform an automatic gain control update.

* * * * *